US010042641B2

United States Patent
Zhang et al.

(10) Patent No.: US 10,042,641 B2
(45) Date of Patent: Aug. 7, 2018

(54) METHOD AND APPARATUS FOR ASYNCHRONOUS PROCESSOR WITH AUXILIARY ASYNCHRONOUS VECTOR PROCESSOR

(71) Applicant: Huawei Technologies Co. Ltd, Shenzhen (CN)

(72) Inventors: Qifan Zhang, Lachine (CA); Wuxian Shi, Kanata Ottawa (CA); Yiqun Ge, Ottawa (CA); Tao Huang, Ottawa (CA); Wen Tong, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 487 days.

(21) Appl. No.: 14/480,573

(22) Filed: Sep. 8, 2014

(65) Prior Publication Data

US 2015/0074374 A1 Mar. 12, 2015

Related U.S. Application Data

(60) Provisional application No. 61/874,794, filed on Sep. 6, 2013, provisional application No. 61/874,810, filed (Continued)

(51) Int. Cl.
*G06F 9/30* (2018.01)
*G06F 9/38* (2018.01)
(Continued)

(52) U.S. Cl.
CPC ............ *G06F 9/30145* (2013.01); *G06F 1/08* (2013.01); *G06F 1/10* (2013.01); *G06F 9/30036* (2013.01);
(Continued)

(58) Field of Classification Search
CPC .... G06F 9/3877; G06F 9/3853; G06F 9/3851; G06F 9/3885; G06F 9/3887;
(Continued)

(56) References Cited

U.S. PATENT DOCUMENTS

| 5,021,985 A | 6/1991 | Hu et al. |
| 5,430,884 A | 7/1995 | Beard et al. |

(Continued)

FOREIGN PATENT DOCUMENTS

| CN | 1296624 A | 5/2001 |
| CN | 1471668 A | 1/2004 |

(Continued)

OTHER PUBLICATIONS

Laurence, "Low-Power High-Performance Asynchronous General Purpose ARMv7 Processor for Multi-core Applications," presentation slides, 13th Int'l Forum on Embedded MPSoC and Multicore, Jul. 2013, Octasic Inc., 52 pages.*

(Continued)

*Primary Examiner* — Yuqing Xiao
(74) *Attorney, Agent, or Firm* — Slater Matsil, LLP

(57) ABSTRACT

An asynchronous processing system comprising an asynchronous scalar processor and an asynchronous vector processor coupled to the scalar processor. The asynchronous scalar processor is configured to perform processing functions on input data and to output instructions. The asynchronous vector processor is configured to perform processing functions in response to a very long instruction word (VLIW) received from the scalar processor. The VLIW comprises a first portion and a second portion, at least the first portion comprising a vector instruction.

20 Claims, 11 Drawing Sheets

Related U.S. Application Data on Sep. 6, 2013, provisional application No. 61/874,856, filed on Sep. 6, 2013, provisional application No. 61/874,914, filed on Sep. 6, 2013, provisional application No. 61/874,880, filed on Sep. 6, 2013, provisional application No. 61/874,889, filed on Sep. 6, 2013, provisional application No. 61/874,866, filed on Sep. 6, 2013.

(51) Int. Cl.
| | | |
|---|---|---|
| *G06F 15/80* | (2006.01) | |
| *G06F 1/08* | (2006.01) | |
| *G06F 1/10* | (2006.01) | |
| *G06F 9/50* | (2006.01) | |

(52) U.S. Cl.
CPC .......... *G06F 9/3826* (2013.01); *G06F 9/3828* (2013.01); *G06F 9/3851* (2013.01); *G06F 9/3853* (2013.01); *G06F 9/3871* (2013.01); *G06F 9/3877* (2013.01); *G06F 9/3885* (2013.01); *G06F 9/3889* (2013.01); *G06F 9/3891* (2013.01); *G06F 9/5011* (2013.01); *G06F 15/8053* (2013.01); *G06F 15/8092* (2013.01); *G06F 15/8007* (2013.01); *G06F 2009/3883* (2013.01)

(58) Field of Classification Search
CPC ............... G06F 9/3889; G06F 15/8007; G06F 15/8053; G06F 15/8092; G06F 2009/3883
USPC ........................ 712/7, 24, 10, 21, 22, 31, 34
See application file for complete search history.

(56) References Cited

U.S. PATENT DOCUMENTS

| | | | |
|---|---|---|---|
| 5,598,113 A | 1/1997 | Jex et al. | |
| 5,758,176 A | 5/1998 | Agarwal et al. | |
| 5,842,034 A | 11/1998 | Bolstad et al. | |
| 5,987,620 A | 11/1999 | Tran | |
| 6,049,882 A | 4/2000 | Paver | |
| 6,108,769 A | 8/2000 | Chinnakonda et al. | |
| 6,633,971 B2 | 10/2003 | Peng et al. | |
| 6,658,581 B1 | 12/2003 | Takahashi et al. | |
| 7,313,673 B2 | 12/2007 | Abernathy et al. | |
| 7,353,364 B1 | 4/2008 | Chong et al. | |
| 7,376,812 B1* | 5/2008 | Sanghavi | G06F 9/30021 712/22 |
| 7,533,248 B1 | 5/2009 | Golla et al. | |
| 7,605,604 B1 | 10/2009 | Young | |
| 7,681,013 B1* | 3/2010 | Trivedi | G06F 9/30032 341/67 |
| 7,698,505 B2 | 4/2010 | Temple, III | |
| 7,752,420 B2 | 7/2010 | Izawa et al. | |
| 7,936,637 B2 | 5/2011 | Shori | |
| 8,005,636 B2 | 8/2011 | Shipton et al. | |
| 8,125,246 B2 | 2/2012 | Grochowski et al. | |
| 8,307,194 B1 | 11/2012 | Scott et al. | |
| 8,464,025 B2* | 6/2013 | Yamaguchi | G06F 15/80 345/418 |
| 8,689,218 B1 | 4/2014 | Awad et al. | |
| 2002/0124155 A1 | 9/2002 | Sami et al. | |
| 2002/0156995 A1 | 10/2002 | Martin et al. | |
| 2003/0065900 A1 | 4/2003 | Mes | |
| 2004/0046590 A1 | 3/2004 | Singh et al. | |
| 2004/0064750 A1 | 4/2004 | Conway | |
| 2004/0103224 A1 | 5/2004 | Duresky et al. | |
| 2004/0215772 A1 | 10/2004 | Dinker et al. | |
| 2005/0038978 A1 | 2/2005 | Nickolls et al. | |
| 2005/0251773 A1 | 11/2005 | Bair et al. | |
| 2005/0273639 A1 | 12/2005 | Pessolano | |
| 2006/0075210 A1 | 4/2006 | Manohar et al. | |
| 2006/0176309 A1 | 8/2006 | Gadre et al. | |
| 2006/0242386 A1 | 10/2006 | Wood | |
| 2006/0277425 A1 | 12/2006 | Renno et al. | |
| 2007/0150697 A1* | 6/2007 | Sachs | G06F 9/30014 712/2 |
| 2007/0186071 A1 | 8/2007 | Bellows et al. | |
| 2008/0238494 A1 | 10/2008 | Ortiz et al. | |
| 2009/0217232 A1 | 8/2009 | Beerel et al. | |
| 2010/0052730 A1 | 3/2010 | Grochowski et al. | |
| 2010/0278190 A1 | 11/2010 | Yip et al. | |
| 2010/0313060 A1 | 12/2010 | Bjorklund et al. | |
| 2011/0057699 A1 | 3/2011 | Szczypinski | |
| 2011/0072236 A1 | 3/2011 | Mimar | |
| 2011/0072238 A1 | 3/2011 | Mimar | |
| 2011/0202713 A1 | 8/2011 | Mes | |
| 2012/0066480 A1* | 3/2012 | Hanaki | G06F 9/30145 712/206 |
| 2012/0159217 A1 | 6/2012 | Venkataramanan et al. | |
| 2013/0024652 A1 | 1/2013 | Bailey et al. | |
| 2013/0080749 A1 | 3/2013 | Ito et al. | |
| 2013/0331954 A1* | 12/2013 | McConnell | G06F 15/7842 700/2 |
| 2013/0346729 A1 | 12/2013 | Barowski et al. | |
| 2014/0189316 A1 | 7/2014 | Govindu et al. | |
| 2014/0281370 A1 | 9/2014 | Khan | |
| 2015/0074443 A1 | 3/2015 | Huang et al. | |
| 2015/0074446 A1 | 3/2015 | Tong et al. | |

FOREIGN PATENT DOCUMENTS

| | | |
|---|---|---|
| CN | 101268615 A | 9/2008 |
| EP | 0 335 514 A2 | 10/1989 |
| EP | 0 529 369 A2 | 3/1993 |
| EP | 0 328 721 B1 | 4/1995 |
| WO | 9201265 A2 | 1/1992 |
| WO | WO 2006/055546 A2 | 5/2006 |

OTHER PUBLICATIONS

Hennessy & David A. Patterson, "Computer Architecture A Quantitative approach," (4th Ed. 2007), pp. 92-97, A-17, A-18, E-56 to E-62.*
Michel Laurence, "Introduction to Octasic Asynchronous Processor Technology," May 2012, IEEE 18th International Symposium on Asynchronous Circuits and Systems, pp. 113-117.*
IEEE 100 The Authoritative Dictionary of IEEE Standards Terms, 7th Ed., 2000, p. 252.*
Wada et al., "A VLIW Vector Media Coprocessor With Cascaded SIMD ALUs," IEEE Transactions on Very Large Scale Integration (VLSI) Systems, vol. 17, No. 9, Sep. 2009, pp. 1285-1295.*
Berekovic et al., "A programmable co-processor for MPEG-4 video," Proceedings, IEEE International Conference on Acoustics, Speech, and Signal Processing, May 2001, pp. 1021-1024.*
Ivan E. Sutherland, "Micropipelines", Communications of the ACM, vol. 32, No. 6, Jun. 1989, p. 720-738.
Sutherland, "Micropipelines," Communications of the ACM, vol. 32, No. 6, Jun. 1989, p. 720-738.
Hennessy, et al., Computer Architecture A Quantitative approach, (4th Ed. 2007), pp. 92-97, A-17, A-18, E-56 to E-62.
Laurence, "Introduction to Octasic Asynchronous Processor Technology," May 2012, IEEE 18th International Symposium on Asynchronous Circuits and Systems, pp. 113-117.
Toosizadeh, N. et al., "VariPipe: Low-overhead Variable-clock Synchronous Pipelines", Department of Electrical and Computer Engineering, University of Toronto, Toronto, Canada, Oct. 4-7, 2009, 8 pages.

* cited by examiner

METHOD AND APPARATUS FOR ASYNCHRONOUS PROCESSOR WITH AUXILIARY ASYNCHRONOUS VECTOR PROCESSOR

CROSS REFERENCE TO RELATED APPLICATIONS

This application claims priority under 35 USC 119(e) to U.S. Provisional Application Ser. Nos. 61/874,794, 61/874,810, 61/874,856, 61/874,914, 61/874,880, 61/874,889, and 61/874,866, all filed on Sep. 6, 2013, and all of which are incorporated herein by reference.

This application is related to:

U.S. patent application Ser. No. 14/480,491 entitled "METHOD AND APPARATUS FOR ASYNCHRONOUS PROCESSOR WITH FAST AND SLOW MODE" filed on Sep. 8, 2014 which is incorporated herein by reference;

U.S. patent application Ser. No. 14/480,522 entitled "METHOD AND APPARATUS FOR ASYNCHRONOUS PROCESSOR REMOVAL OF META-STABILITY" filed on Sep. 8, 2014 which is incorporated herein by reference;

U.S. patent application Ser. No. 14/480,561 entitled "METHOD AND APPARATUS FOR ASYNCHRONOUS PROCESSOR WITH A TOKEN RING BASED PARALLEL PROCESSOR SCHEDULER" filed on Sep. 8, 2014 which is incorporated herein by reference;

U.S. patent application Ser. No. 14/480,556 entitled "METHOD AND APPARATUS FOR ASYNCHRONOUS PROCESSOR PIPELINE AND BYPASS PASSING" filed on Sep. 8, 2014 which is incorporated herein by reference; and U.S. patent application Ser. No. 14/480,531 entitled "METHOD AND APPARATUS FOR ASYNCHRONOUS PROCESSOR BASED ON CLOCK DELAY ADJUSTMENT" filed on Sep. 8, 2014 which is incorporated herein by reference.

TECHNICAL FIELD

The present disclosure relates generally to asynchronous circuit technology, and more particularly, to an asynchronous processor with auxiliary asynchronous vector processor.

BACKGROUND

High performance synchronous digital processing systems utilize pipelining to increase parallel performance and throughput. In synchronous systems, pipelining results in many partitioned or subdivided smaller blocks or stages and a system clock is applied to registers between the blocks/stages. The system clock initiates movement of the processing and data from one stage to the next, and the processing in each stage must be completed during one fixed clock cycle. When certain stages take less time than a clock cycle to complete processing, the next processing stages must wait—increasing processing delays (which are additive).

In contrast, asynchronous systems (i.e., clockless) do not utilize a system clock and each processing stage is intended, in general terms, to begin its processing upon completion of processing in the prior stage. Several benefits or features are present with asynchronous processing systems. Each processing stage can have a different processing delay, the input data can be processed upon arrival, and consume power only on demand.

FIG. 1 illustrates a prior art Sutherland asynchronous micro-pipeline architecture 100. The Sutherland asynchronous micro-pipeline architecture is one form of asynchronous micro-pipeline architecture that uses a handshaking protocol built by Muller-C elements to control the micro-pipeline building blocks. The architecture 100 includes a plurality of computing logic 102 linked in sequence via flip-flops or latches 104 (e.g., registers). Control signals are passed between the computing blocks via Muller C-elements 106 and delayed via delay logic 108. Further information describing this architecture 100 is published by Ivan Sutherland in Communications of the ACM Volume 32 Issue 6, June 1989 pages 720-738, ACM New York, N.Y., USA, which is incorporated herein by reference.

Now turning to FIG. 2, there is illustrated a typical section of a synchronous system 200. The system 200 includes flip-flops or registers 202, 204 for clocking an output signal (data) 206 from a logic block 210. On the right side of FIG. 2 there is shown an illustration of the concept of meta-stability. Set-up times and hold times must be considered to avoid meta-stability. In other words, the data must be valid and held during the set-up time and the hold time, otherwise a set-up violation 212 or a hold violation 214 may occur. If either of these violations occurs, the synchronous system may malfunction. The concept of meta-stability also applies to asynchronous systems. Therefore, it is important to design asynchronous systems to avoid meta-stability. In addition, like synchronous systems, asynchronous systems also need to address various potential data/instruction hazards, and should include a bypassing mechanism and pipeline interlock mechanism to detect and resolve hazards.

Accordingly, there are needed asynchronous processing systems, asynchronous processors, and methods of asynchronous processing that are stable and detect and resolve potential hazards.

SUMMARY

According to one embodiment, there is provided an asynchronous processing system comprising an asynchronous scalar processor and an asynchronous vector processor coupled to the scalar processor. The asynchronous scalar processor is configured to perform processing functions on input data and to output instructions. The asynchronous vector processor is configured to perform processing functions in response to a very long instruction word (VLIW) received from the scalar processor. The VLIW comprises a first portion and a second portion, at least the first portion comprising a vector instruction.

In another embodiment, there is provided a method of operating an asynchronous processing system comprising an asynchronous scalar processor and an asynchronous vector processor coupled to the asynchronous scalar processor. The method comprises performing processing functions on input data at the scalar processor and sending a very long instruction word (VLIW) to the vector processor. The VLIW comprises a first portion and a second portion and at least the first portion comprises a vector instruction. The method comprises performing processing functions on the received VLIW.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Asynchronous technology seeks to eliminate the need of synchronous technology for a global clock-tree which not only consumes an important portion of the chip power and die area, but also reduces the speed(s) of the faster parts of the circuit to match the slower parts (i.e., the final clock-tree rate derives from the slowest part of a circuit). To remove the clock-tree (or minimize the clock-tree), asynchronous technology requires special logic to realize a handshaking protocol between two consecutive clock-less processing circuits. Once a clock-less processing circuit finishes its operation and enters into a stable state, a signal (e.g., a "Request" signal) is triggered and issued to its ensuing circuit. If the ensuing circuit is ready to receive the data, the ensuing circuit sends a signal (e.g., an "ACK" signal) to the preceding circuit. Although the processing latencies of the two circuits are different and varying with time, the handshaking protocol ensures the correctness of a circuit or a cascade of circuits.

Hennessy and Patterson coined the term "hazard" for situations in which instructions in a pipeline would produce wrong answers. A structural hazard occurs when two instructions might attempt use the same resources at the same time. A data hazard occurs when an instruction, scheduled blindly, would attempt to use data before the data is available in the register file.

Figure 3A:
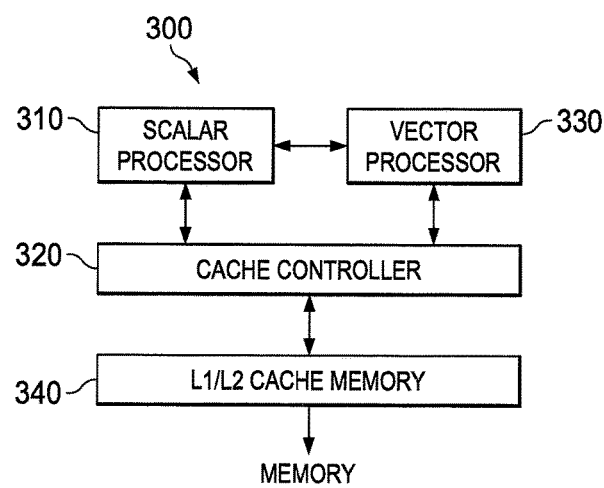
FIG. 3A illustrates an asynchronous processing system in accordance with disclosed embodiments of the present disclosure.
Figure 2:
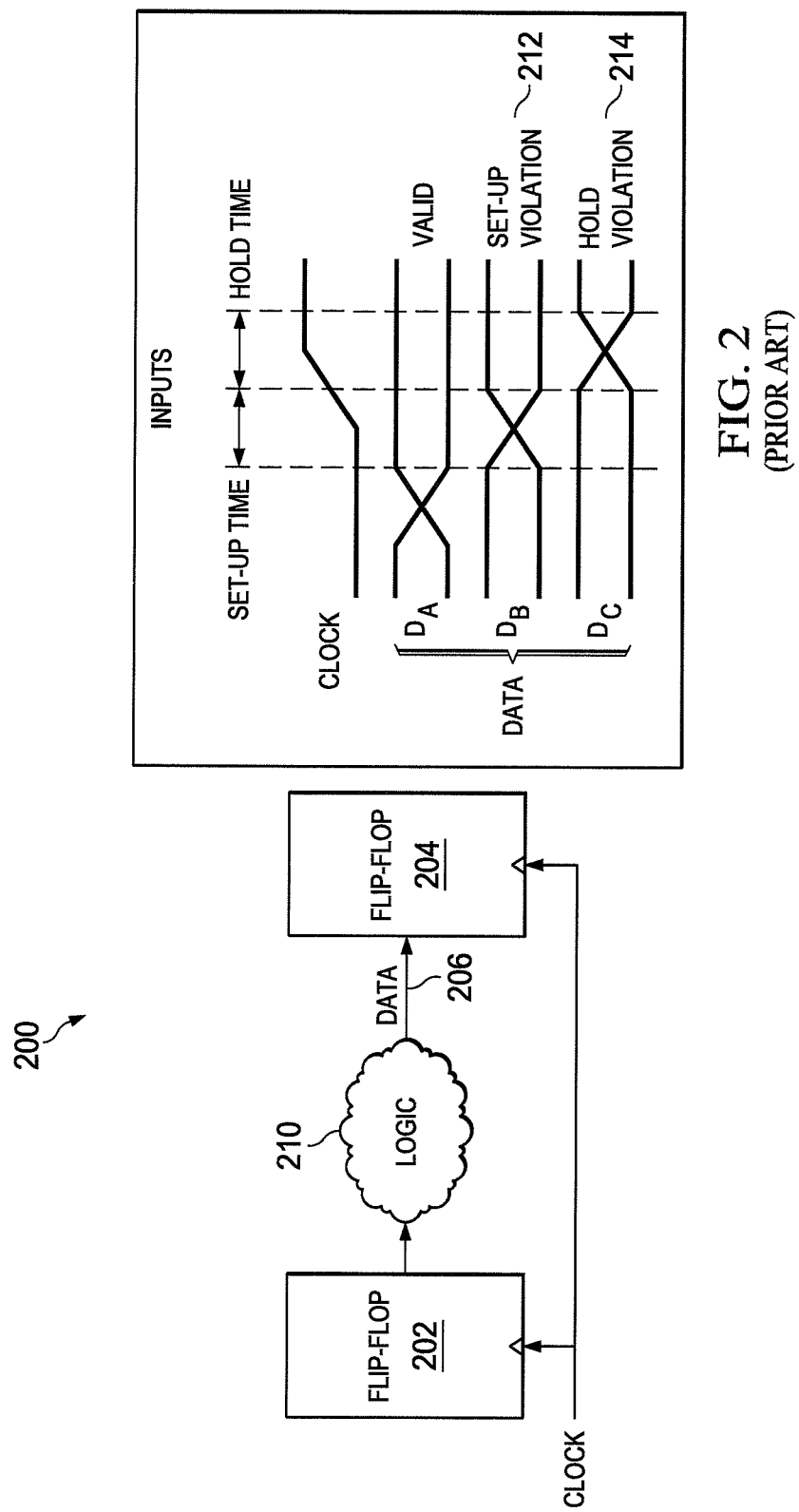
FIG. 2 is a block diagram illustrating the concept of meta-stability in a synchronous system.

With reference to FIG. 3A, there is shown a block diagram of an asynchronous processing system 300 in accordance with the present disclosure. The system 300 includes an asynchronous scalar processor 310, an asynchronous vector processor 330, a cache controller 320 and L1/L2 cache memory 340. As will be appreciated, the term "asynchronous processor" may refer to the processor 310, the processor 330, or the processors 310, 330 in combination. Though only one processor 310, 330 is shown, the processing system 300 may include more than one of these processors. In addition, it will be understood that each processor may include therein multiple CPUs, control units, execution units and/or ALUs, etc. For example, the asynchronous scalar processor 310 may include multiple execution units with each execution unit having a desired number of pipeline stages. In one example, the processor 310 may include sixteen execution units with each execution unit having five stages. Similarly, the asynchronous vector processor 330 may include multiple execution units with each execution unit having a desired number of pipeline stages.

The L1/L2 cache memory 340 may be subdivided into L1 and L2 cache, and may also be subdivided into instruction cache and data cache. Likewise, the cache controller 320 may be functionally subdivided.

Figure 3B:
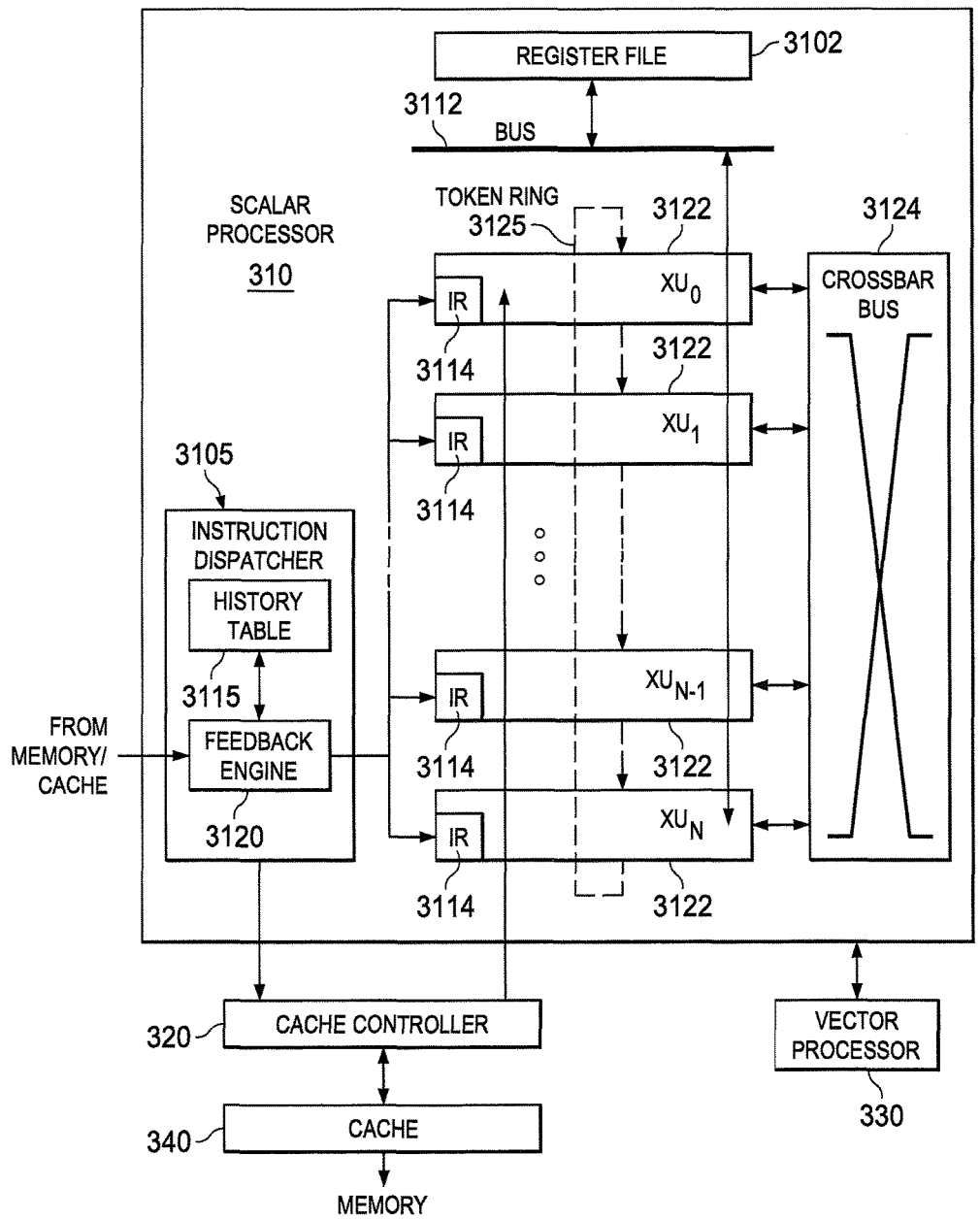
FIG. 3B illustrates a block diagram of an exemplary asynchronous scalar processor shown in FIG. 3A in accordance with disclosed embodiments of the present disclosure.

Now turning to FIG. 3B, there is illustrated in more detail a block diagram of the asynchronous scalar processor 310 shown in FIG. 3A. The asynchronous scalar processor 310 includes a register file 3102 coupled to a resource bus 3112. The scalar processor 310 also includes an instruction dispatcher 3105, a plurality of CPUs (also referred to as execution units (XU's)) 3122 and a crossbar bus 3124. As previously described, the asynchronous scalar processor 310 is coupled to the cache controller 320 and/or the L1/L2 cache 340, and the asynchronous vector processor 330.

The instruction dispatcher 3105 is configured to dispatch one or more instructions and to drive the plurality of CPUs 3122. While an instruction is being executed by a given CPU, the instruction dispatcher 3105 is configured to dispatch another instruction to the given CPU (e.g., the other instruction is pre-fetched). The pre-fetched instruction for each CPU is held in a corresponding CPU instruction register 3114.

The instruction dispatcher 3105 comprises an instruction timing history table 3115 and a feedback engine 3120. The instruction dispatcher 3105 is configured to decode an instruction received from memory/cache, determine the timing for the instruction, calculate data dependency based on the history table 3115, and update the history table 3115. For example, the feedback engine 3120 is configured to receive an instruction from memory and/or cache, decode the received instruction, and detect a data dependency via the history table 3115. To illustrate, the feedback engine 3120 is configured to access the history table 3115 to determine whether this piece of data is on the crossbar bus 3124 or on the register file 3102. To determine this, the feedback engine 3115 may track the time a given register of the register file 3102 was last modified. This time may be stored in the history table 3115.

The crossbar bus 3124 is configured to resolve data hazards and to provide bypassing of the register file 3102 by providing access to the results of a register write operation from a given CPU without having to fetch the results of the register write operation from the register file 3102.

The CPUs 3122 are linked by a token ring 3125. The token ring 3125 is configured to resolve structural hazards for common resources by propagating a given token from one processing component to other processing components along a token signal path.

Figure 3C:
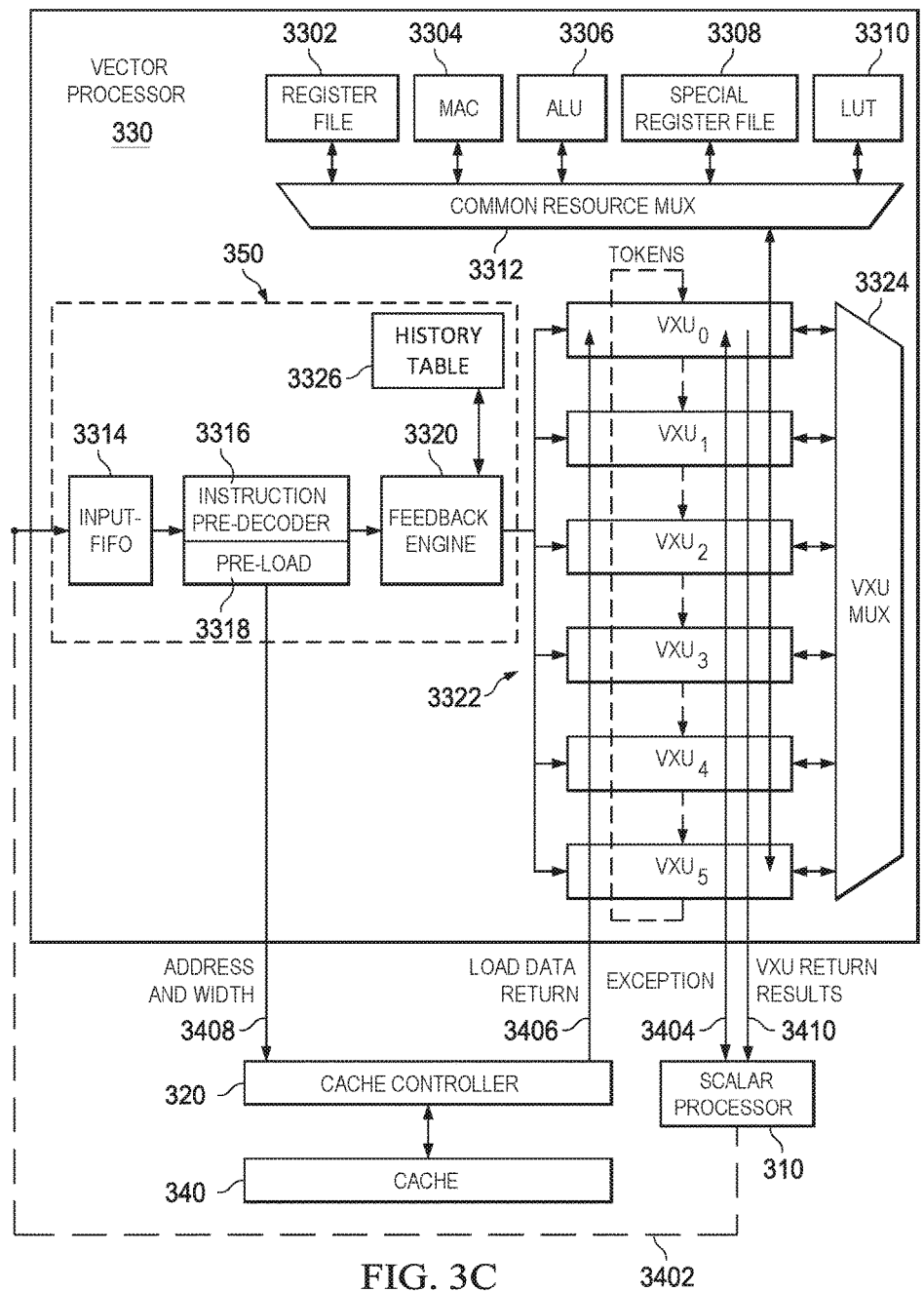
FIG. 3C illustrates a block diagram of an exemplary asynchronous vector processor shown in FIG. 3A in accordance with disclosed embodiments of the present disclosure.

Now turning to FIG. 3C, there is illustrated in more detailed a block diagram of the asynchronous vector processor 330 shown in FIG. 3A. Aspects of the present disclosure provide architectures and techniques for a clockless asynchronous processor architecture that includes an asynchronous vector coprocessor.

The asynchronous vector processor 330 includes a register file 3302, a multiply/accumulate (MAC) unit 3304, an arithmetic logic unit (ALU) 3306, a special register file 3308 and a look up table (LUT) 3310 coupled to a common resource multiplexor 3312. The vector processor 330 also includes an input-FIFO 3314, an instruction pre-decoder 3316, a pre-load module 3318, a feedback engine 3320, a plurality of CPUs (also referred to as vector execution units (VXU's)) 3322 and a VXU multiplexor (VMUX) 3324. As previously described, the asynchronous vector processor 330 is coupled to the cache controller 320 and/or the L1/L2 cache 340, and the asynchronous scalar processor 310.

Figure 4:
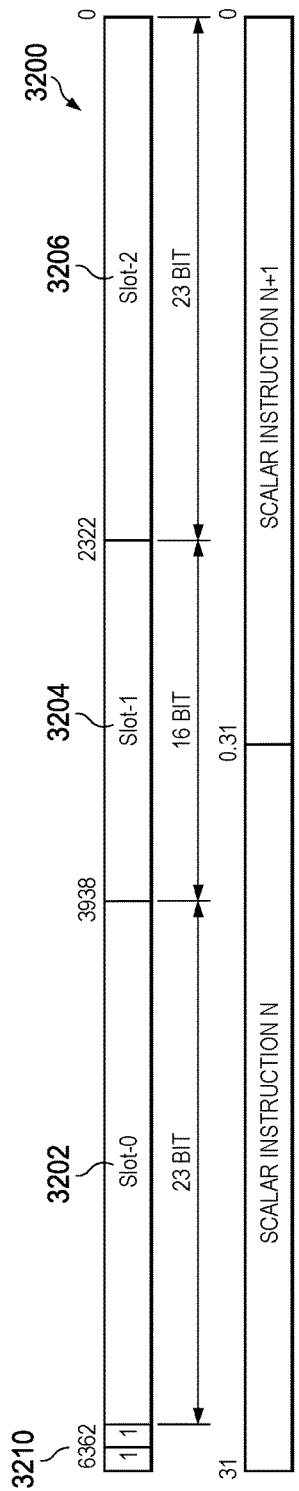
FIG. 4 illustrates an exemplary vector processor VLIW instruction formed from two scalar instructions in accordance with disclosed embodiments of the present disclosure.

The vector processor 330 operates on very long instruction words (VLIWs). FIG. 4 illustrates an exemplary vector processor VLIW instruction 3200 formed from two scalar instructions N and N+1. As illustrated, the VLIW instruction 3200 includes sixty-four bits and three slots. VLIW instructions are prefixed with "11" in the 64-bit bundle. Each slot contains "sub" instructions that can be executed in parallel. Each "sub" instruction is a single instruction, multiple data (SIMD) instruction. For example, a first slot 3202 (i.e., "slot-0") is a 23-bit slot that supports vector LOAD/STORE, vector ALU, MOVE and CONV, Special Register Read/Write, Look-Up-Table (LUT) and Short Scalar instructions (SSI). A second slot 3204 (e.g., "slot-1") is a 16-bit slot that supports vector MUL/MAC instructions, and a third slot 3206 (e.g., "slot-2") is a 23-bit slot similar to the first slot 3202. For slot-0 and slot-2, when the MSB is a zero, a SSI is embedded within the sub-instruction. An unused slot in the vector engine instruction 3200 may be filled with a No Operation (NOP) instruction. As illustrated, only 62 bits are used for instructions within the vector engine instruction 3200. The two most significant bits (MSB) 3210 are used to distinguish VLIW from pure scalar instructions.

These VLIW instructions are generated by the scalar processor 310 which fetches standard instructions from the instruction cache. The scalar processor 310 processes the fetched instructions by performing certain decoding functions (e.g., address calculations for load/store instructions) and providing the associated scalar data and/or memory addresses to generate the VLIW instruction to the vector processor 330. Execution of the vector processor VLIW instructions is independent of the execution of the scalar processor instructions. Depending on the instructions, the vector processor 330 may return the result of an execution back to the scalar processor 310.

Information for tracking purposes may also be sent with the VLIW instructions to the vector processor 330. This tracking information helps identify a scalar processor execution unit pair that launches the VLIW and the associated program counter FIFO index as described in further detail below with respect to FIG. 5. The tracking information also helps to direct any data that the vector processor 330 returns to the scalar processor 310.

The input FIFO 3314 stores the VLIW instruction and scalar register contents from the scalar processor 310. It also receives other information from the scalar processor 310, such as a scalar execution unit ID, a PC FIFO count and indicators for LOAD instructions and SSIs. A given VXU 3322 can fetch instructions from the input FIFO 3314 as long as the input FIFO 3314 is not empty. The input FIFO 3314 will continue to receive VLIW instructions from the scalar processor 310 as long as the input FIFO 3314 is not full. The input FIFO will become full when the last storage slot is taken by a VLIW instruction. The scalar processor 310 will be notified by the input FIFO 3314 that no more VLIW instructions are to be sent to the vector processor 330. In other words, even when an execution unit within the scalar processor 310 receives a vector processor token, it will hold the token until the full notification from the input FIFO 3314 is removed.

When a VLIW instruction arrives at the input FIFO 3314 from the scalar processor 310, the input FIFO empty signal is de-asserted. When the last VLIW instruction is read from the input FIFO by a given VXU 3322, the input FIFO empty signal will be asserted.

The instruction pre-decoder 3316 performs some pre-decoding functions on the VLIW instructions such as analyzing instruction types and determining whether there exists any SSI or scalar instructions within the VLIW. LOAD requests are sent to the pre-load module 3318, which sends address, request and other information to the cache controller 320. The cache controller 320 requests this data from the L1/L2 cache 340. In addition, data is sent from the cache controller 320 to a given VXU 3322 that requests the LOAD.

The feedback engine 3320 is responsible for determining where the input parameters of the instructions come from. Input parameters can come from vector registers and the VMUX 3324. To determine this, the feedback engine 3320 tracks the time each vector register was last modified. This time may be stored in a history table 3326. Each entry of the history table 3326 may correspond to one vector register and may contain the time that a given vector register was last modified.

As will be appreciated, the input FIFO 3314, the instruction pre-decoder 3316, the pre-load module 3318 and the feedback engine 3320 may be collectively referred to as a vector processor interface (VPI) or vector instruction fetch (VIF) block 350.

Time is incremented in response to a fetch of a VLIW instruction by a given VXU 3322. Based on the fetched instruction, the feedback engine 3320 points to the vector register entry and extracts the time of when it was last modified. The last modified time is then compared to the current time of the instruction being executed. If the difference is equal to or less than 6 (the number of VXUs illustrated), it means that the content of the given vector register is available from the VMUX 3324. Otherwise, when the difference in time is larger than 6, the instruction has to retrieve the parameters directly from the vector register.

The special registers 3308 (Select/Boolean Registers) are made available for the VXUs 3322 in a similar way as the vector registers. The feedback engine 3320 determines whether the input parameters for the special registers 3308 should be read from the VMUX 3324 or the given special register 3308.

The VXUs 3322 oversee the operations of the vector processor 330 and control all the tokens and pulse generations within the vector processor 330. A given VXU 3322 receives the VLIW instruction from the feedback engine 3320 while executing a current VLIW instruction. Depending on the specific instructions embedded in the VLIW instruction, a given VXU 3322 gathers the input operands from multiple possible sources. Instructions are carried out by the given VXU or other calculation resources.

Tokens flow through each of the VXUs 3322. In the illustrated embodiment there are a total of 6 identical VXUs in the vector processor 330. Each VXU 3322 is configured to execute three sub-instructions within one VLIW instruction, one sub-instruction in each slot. Each slot has its own decoder. Outputs of each of the VXUs 3322 are coupled to the VMUX 3324. This allows the vector outputs to be used by other VXUs as soon as they are ready.

Representative functions of the VXUs 3322 include: generating asynchronous pulses for vector processor operations; performing simple 128-bit SIMD operations that can be split into two independent 64-bit portions; managing the flow of tokens; executing vector LOAD/STORE instructions that do not use Align Registers; executing some of the most commonly used and non-computationally intensive instructions; supporting three independent instructions in one VLIW instruction; decoding each instruction and generate internal control signals for executions performed in the VXU; supporting up to three input vector registers and one output vector register per slot; and supporting writing back to vector registers through a register return port.

With reference still to FIG. 3C, the vector processor 330 includes various interfaces or ports. These include an instruction port 3402, a reset and exception port 3404, a load data port 3406, a store data port 3408, and a register return port 3410.

Reset indications or exception reports are exchanged between the scalar processor 310 and the vector processor 330 via the reset and exception port 3404. When a user resets the scalar processor 310, the scalar processor 310 will pass along a reset signal to the vector processor 330 via the reset and exception port 3404. The vector processor 330 similarly uses the reset and exception port 3404 to send exception information back to the scalar processor 310. This information can be used to identify the instruction which causes an exception.

Load operations are exchanged between the scalar processor 310 and the vector engine processor 330 via the load data port 3406. The vector processor 330 is configured to generate address/width requests and send the requests to the cache controller 320 and the L1/L2 cache 340 via the store data port 3408.

The register return port 3410 provides register return access to the registers in the scalar processor 310. Results of calculations performed by the vector processor 330 may be fed back to the scalar processor 310 through the register return port 3410 and into the scalar registers. The register return port 3410 returns values to the execution unit pair that launches the VLIW in the scalar processor 310. A register return token internal to the vector processor 330 controls access to the register return port 3410 to avoid contention between instructions.

Figure 5:
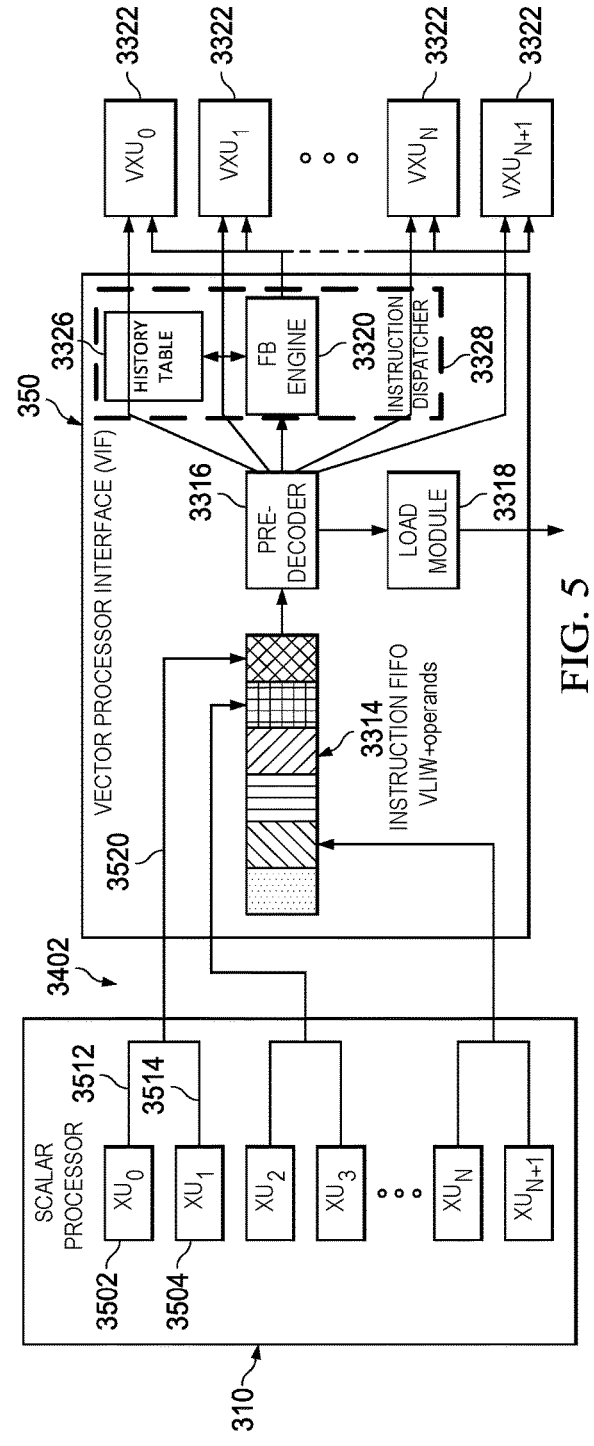
FIG. 5 illustrates a block diagram of an exemplary vector instruction fetch block shown in FIG. 3C in accordance with disclosed embodiments of the present disclosure.

Now turning to FIG. 5, there is illustrated in more detail the exemplary vector processor interface (VPI) or vector instruction fetch (VIF) block 350. The VIF block 350 includes the input-FIFO 3314, the instruction pre-decoder 3316, the pre-load module 3318, and the feedback engine 3320, as previously noted. The VIF block 350 interfaces with the scalar processor 310 and receives instructions for the vector processor 330. As shown, a first scalar instruction 3512 generated by a first scalar execution unit 3502 is combined with a second scalar instruction 3514 generated by a second execution unit 3504 to form one VLIW instruction 3520. The VIF block 350 stores the received VLIW and its associated information in the input FIFO 3314 and sends them to the given VXU 3322 upon request. The VIF block 350 extracts vector LOAD addresses to the cache controller 320 to start the load operation in advance, before the given VXU 3322 is ready to operate on the load instruction. The VIF block 350 also pre-processes the multiple instructions in the VLIW instruction via the instruction pre-decoder 3316 to determine where to retrieve the input operands. The load module 3318 extracts the vector LOAD addresses for the cache controller 320 for data dependency resolution.

Figure 1:
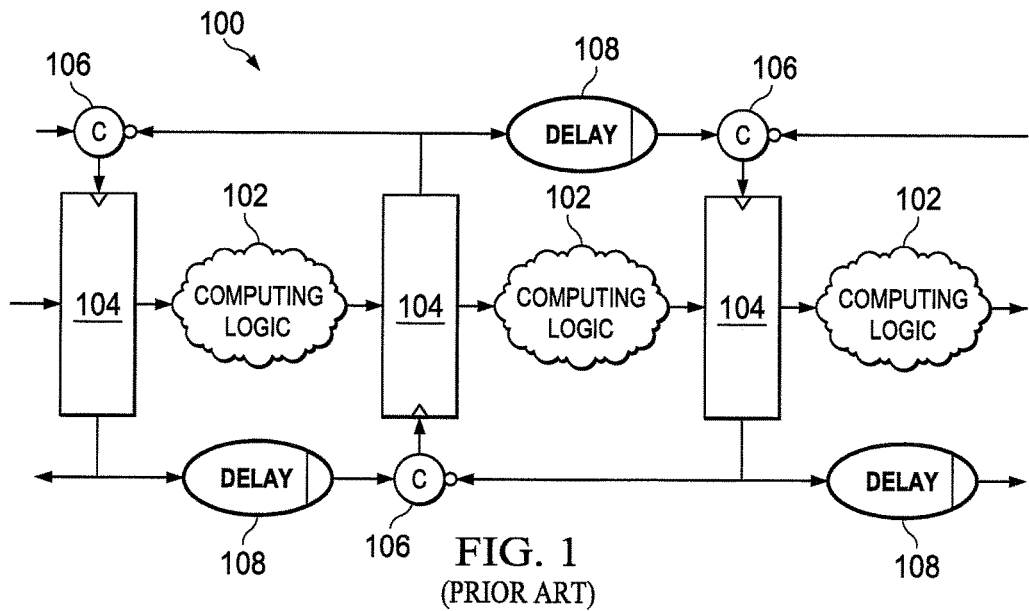
FIG. 1 illustrates a prior art asynchronous micro-pipeline architecture.
Figure 6:
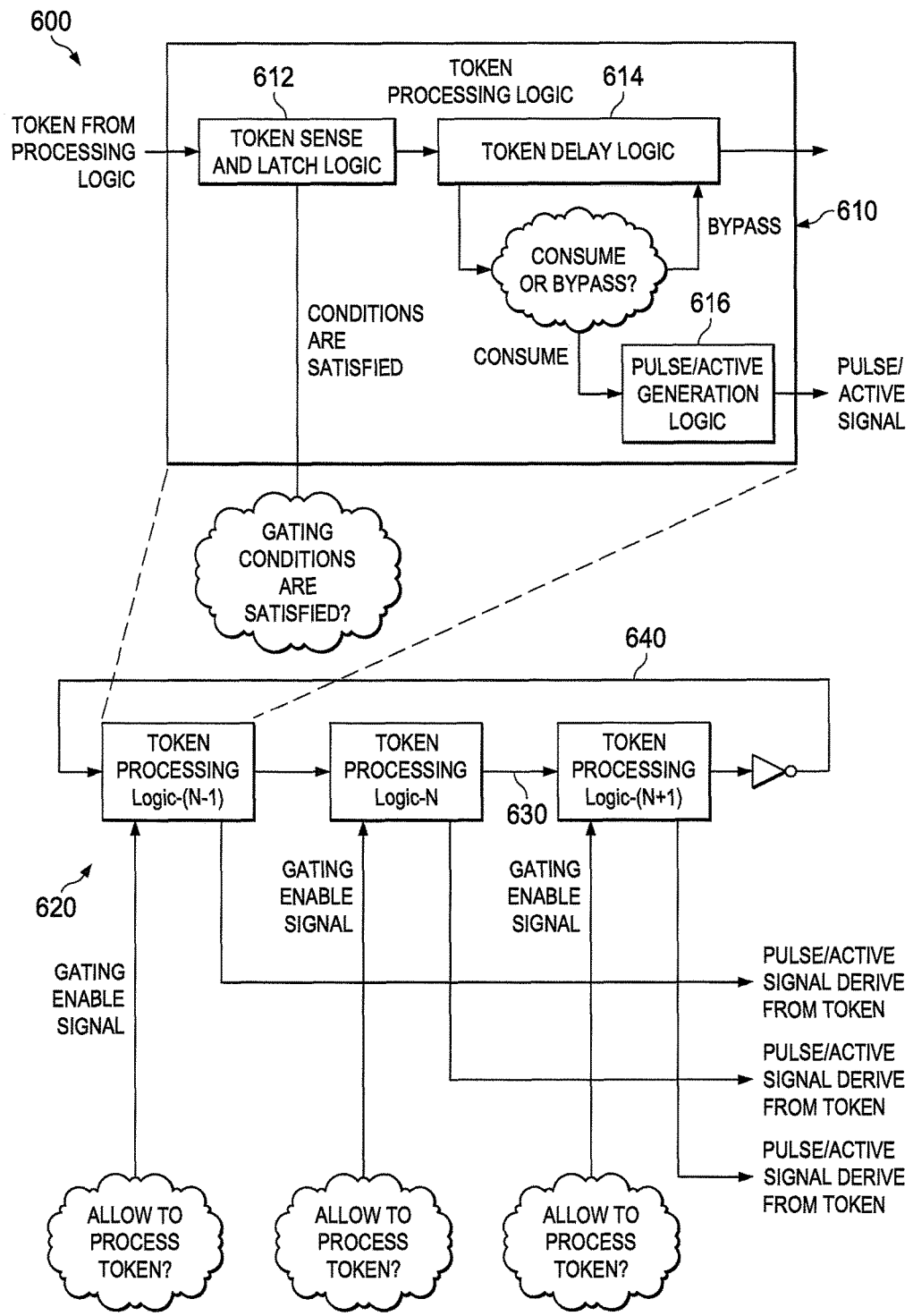
FIG. 6 illustrates an example of a token ring architecture in accordance with disclosed embodiments of the present disclosure.

FIG. 6 illustrates an example of a token ring architecture 600 as an alternative to the architecture above in FIG. 1. The components of this architecture are supported by standard function libraries for chip implementation. For example, the token ring architecture 600 comprises a token processing logic unit 610. The token processing logic 610 comprises token-sense-latch-logic 612 and a variable delay chain 614. In some embodiments, the token processing logic unit 610 may also comprise pulse/active generation logic 616. The token processing logic unit 610 may include any suitable circuitry for detecting reception of a token. The token processing logic unit 610 is configured to propagate the token from one processing component to other processing components along a token signal path.

As described above with respect to FIG. 1, the Sutherland asynchronous micro pipeline architecture requires the handshaking protocol, which is realized by the non-standard Muller-C elements. In order to avoid using Muller-C elements (as in FIG. 1), a series of token processing logic units are used to control the processing of different computing logic (not shown), such as processing units on a chip (e.g., ALUs) or other functional calculation units, or the access of the computing logic to system resources, such as registers or memory. To cover the long latency of some computing logic, the token processing logic unit 610 is replicated to several copies and arranged in a series of token processing logic units as shown at 620. Each token processing logic unit 610 in the series 620 controls the passing of one or more token signals 630 (associated with one or more resources). A token signal 630 passing through the token processing logic units in series 620 forms a token ring 640. The token ring 640 regulates the access of the computing logic (not shown) to the system resource (e.g., memory, register) associated with that token signal. The token processing logic 610 accepts, holds, and passes the token signal 630 between each other in a sequential manner. When the token signal 630 is held by the token processing logic 610, the computing logic associated with that token processing logic is granted the exclusive access to the resource corresponding to that token signal, until the token signal is passed to a next token processing logic in the ring. Holding and passing the token signal concludes the computing logic's access or use of the corresponding resource, and is referred to herein as consuming the token. Once the token is consumed, it is released by the given token processing logic unit to a subsequent token processing logic unit in the ring.

Figure 7:
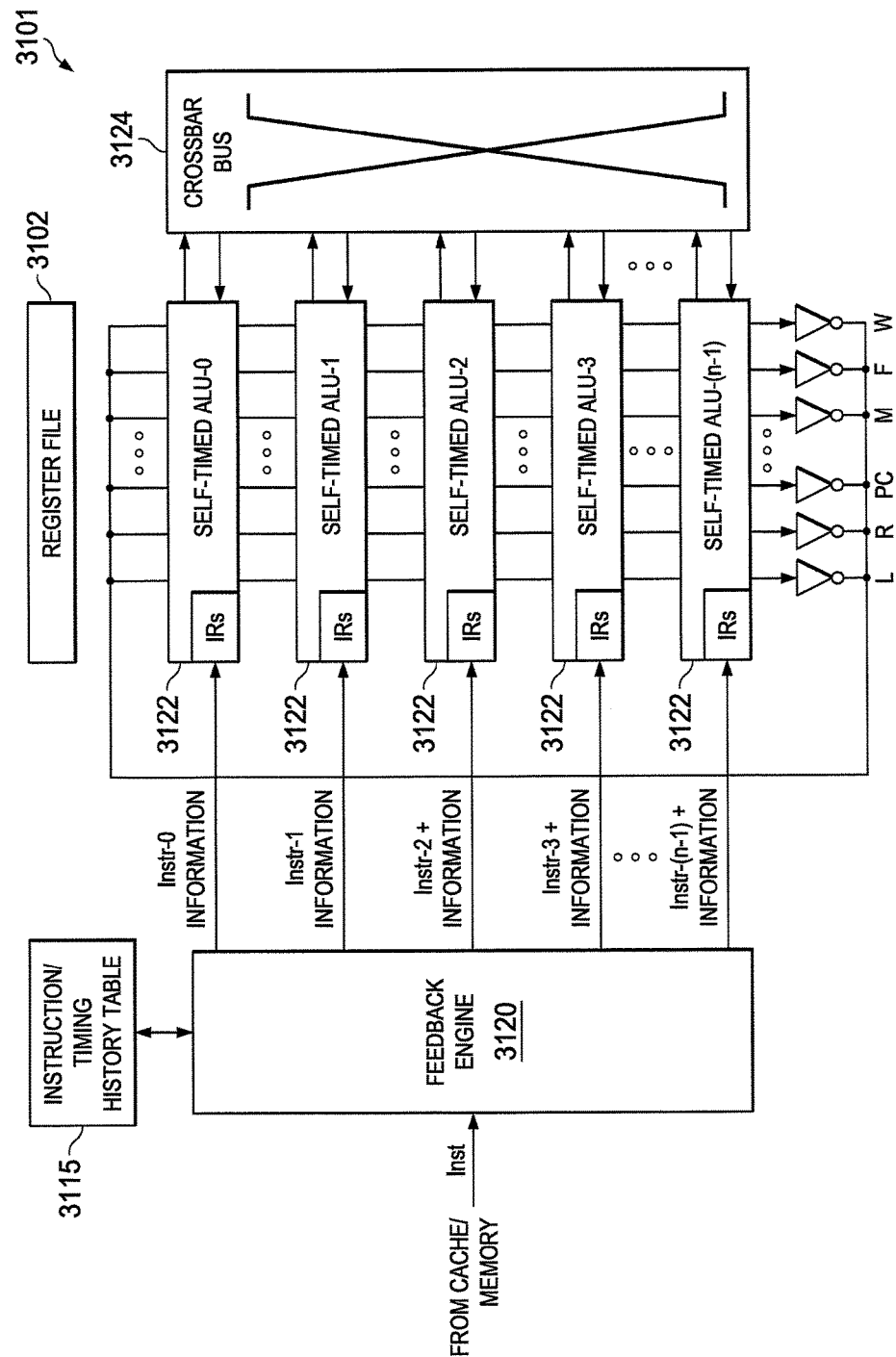
FIG. 7 illustrates an example of an asynchronous processor architecture in accordance with disclosed embodiments of the present disclosure.

FIG. 7 illustrates an asynchronous processor architecture 3101. The architecture includes a plurality of self-timed (asynchronous) arithmetic and logic units (ALUs) 3122 coupled in parallel in a token ring architecture as described above with respect to FIG. 6. Each ALU 3122 may correspond to the token processing logic unit 610 of FIG. 6. The asynchronous processor architecture 3101 also includes a feedback engine 3120 for properly distributing incoming instructions between the ALUs 3122, an instruction/timing history table 3115 accessible by the feedback engine 3120 for determining the distribution of instructions, a register (memory) 3102 accessible by the ALUs 3122, and a crossbar 3124 for exchanging needed information between the ALUs 3122. The history table 3115 is used for indicating timing and dependency information between multiple input instructions to the processor system. Instructions from the instruction cache/memory are received by the feedback engine 3120 which detects or calculates the data dependencies and determines the timing for instructions using the history table 3115. The feedback engine 3120 pre-decodes each instruction to decide how many input operands this instruction requires. The feedback engine 3120 then looks up the history table 3115 to find whether this piece of data is on the crossbar 3124 or on the register file 3102. If the data is found on the crossbar 3124, the feedback engine 3120 calculates which ALU produces the data. This information is tagged to the instruction dispatched to the ALUs 3122. The feedback engine 3120 also updates the history table 3115 accordingly.

Figure 8:
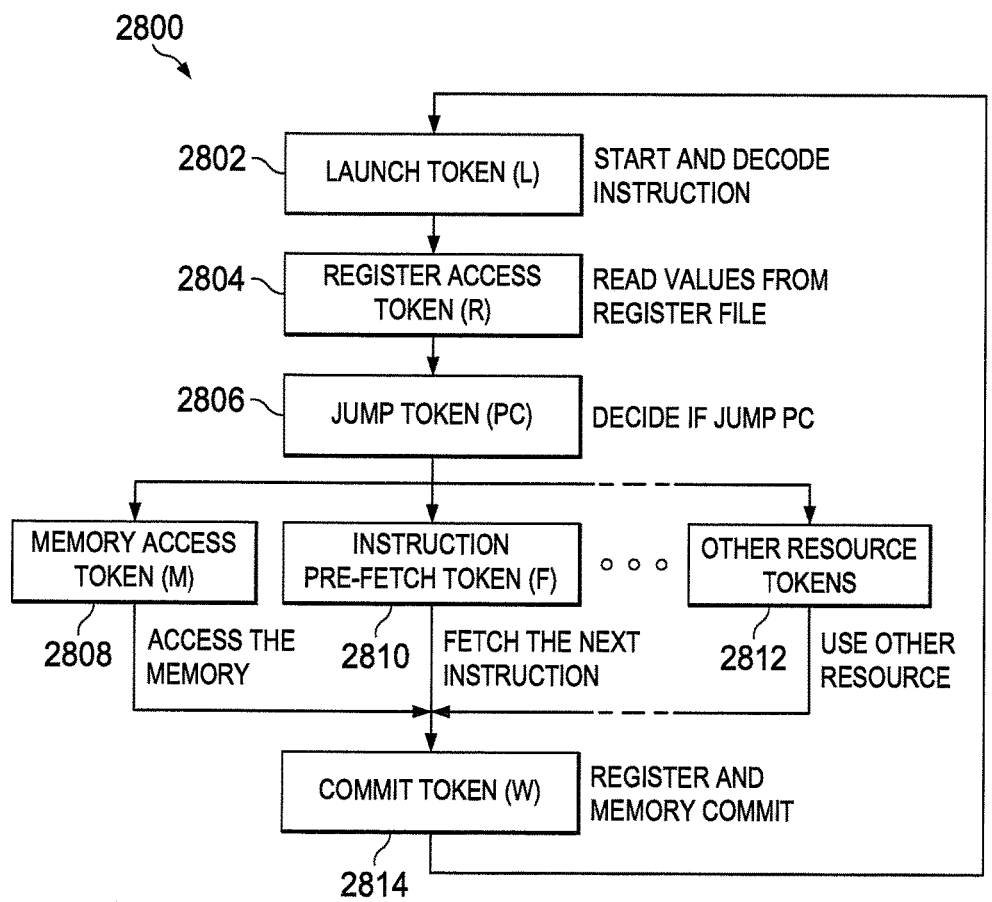
FIG. 8 illustrates token based pipelining with gating within an ALU in accordance with disclosed embodiments of the present disclosure.

FIG. 8 illustrates token based pipelining with gating within an ALU, also referred to herein as token based pipelining for an intra-ALU token gating system 2800. The intra-ALU token gating system 2800 comprises a plurality of tokens including a launch token 2802 associated with a start and decode instruction, a register access token 2804 associated with reading values from a register file, a jump token 2806 associated with a program counter jump, a memory access token 2808 associated with accessing a memory, an instruction pre-fetch token 2810 associated with fetching the next instruction, an other resources token 2812 associated with use of other resources, and a commit token 2814 associated with register and memory commit.

Designated tokens are used to gate other designated tokens in a given order of the pipeline. This means that when a designated token passes through an ALU, a second designated token is then allowed to be processed and passed by the same ALU in the token ring architecture. In other words, releasing one token by the ALU becomes a condition to consume (process) another token in that ALU in that given order.

A particular example of a token-gating relationship is illustrated in FIG. 8. It will be appreciated by one skilled in the art that other token-gating relationships may be used. In the illustrated example, the launch token (L) 2802 gates the register access token (R) 2804, which in turn gates the jump token (PC token) 2806. The jump token 2806 gates the memory access token (M) 2808, the instruction pre-fetch token (F) 2810, and possibly other resource tokens 2812 that may be used. This means that tokens M 2808, F 2810, and other resource tokens 2812 can only be consumed by the ALU after passing the jump token 2806. These tokens gate the commit token (W) 2814 to register or memory. The commit token 2814 is also referred to herein as a token for writing the instruction. The commit token 2814 in turn gates the launch token 2802. The gating signal from the gating token (a token in the pipeline) is used as input into a consumption condition logic of the gated token (the token in the next order of the pipeline). For example, the launch token (L) 2802 generates an active signal to the register access or read token (R) 2804 when the launch token (L) 2802 is released to the next ALU. This guarantees that any ALU would not read the register file until an instruction is actually started by the launch token 2802.

Figure 9:
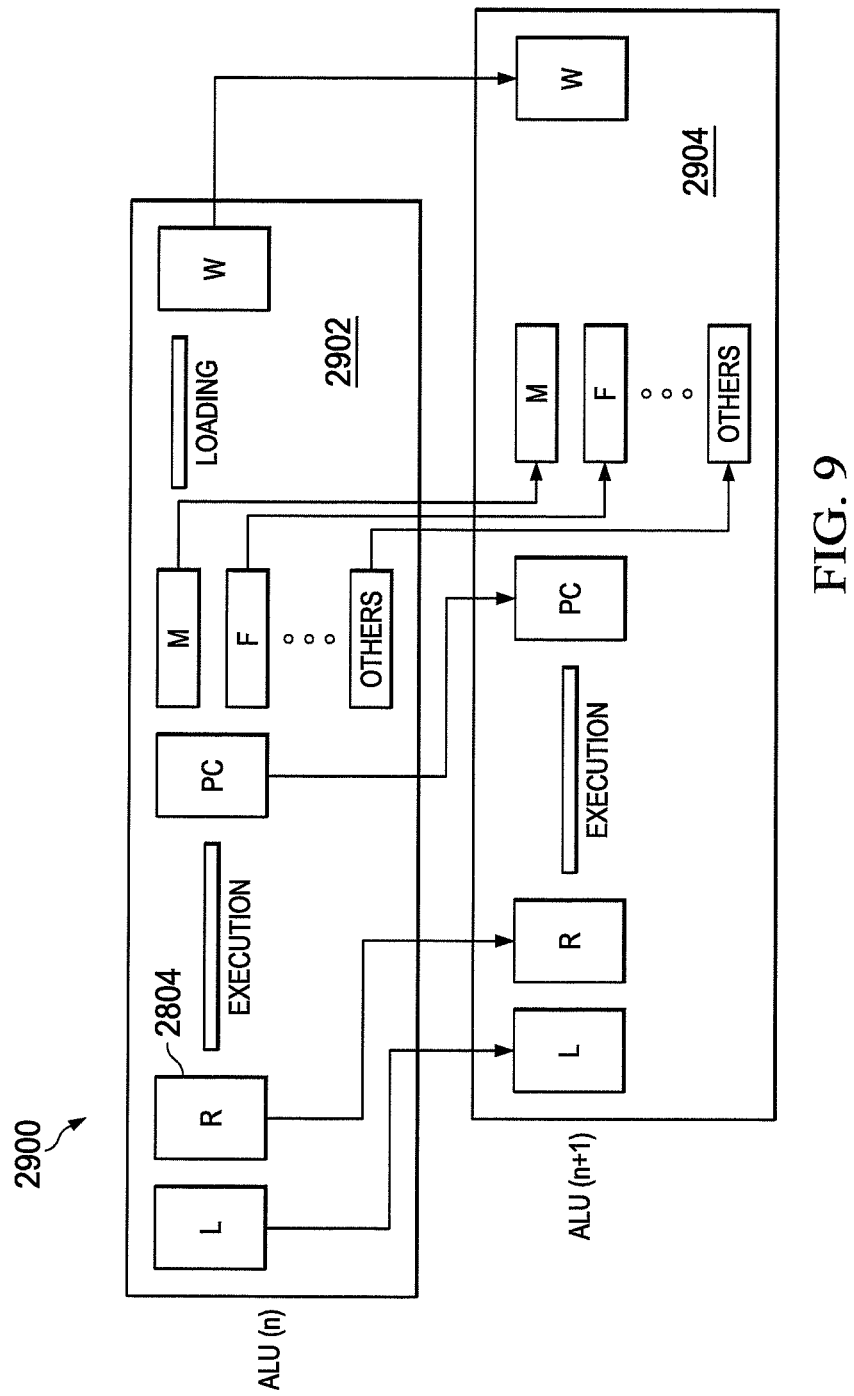
FIG. 9 illustrates token based pipelining for an inter-ALU token passing system in accordance with disclosed embodiments of the present disclosure.

FIG. 9 illustrates token based pipelining for an inter-ALU token passing system 2900. The inter-ALU token passing system 2900 comprises a first ALU 2902 and a second ALU 2904. A consumed token signal triggers a pulse to a common resource. For example, the register-access token 2804 in the first CPU 2902 triggers a pulse to the register file (not shown). The token signal is delayed before it is released to the next ALU (e.g., the second ALU 2904) for a period of time such that there is no structural hazard on this common resource (e.g., the register file) between the first ALU 2902 and the second ALU 2904. The tokens not only preserve multiple ALUs from launching and committing (or writing) instructions in the program counter (PC) order, but also avoid structural hazard among the multiple ALUs.

Figure 10:
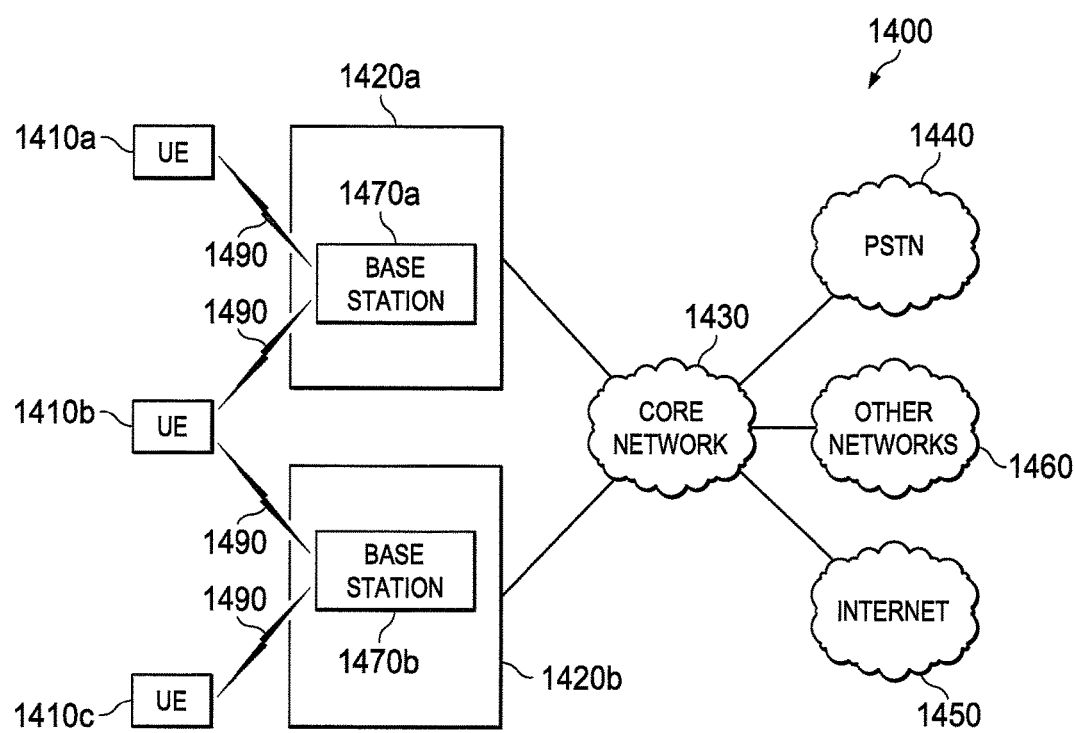
FIG. 10 illustrates an example communication system in which the asynchronous processor and processing system may be utilized.

FIG. 10 illustrates an example communication system 1400 that may be used for implementing the devices and methods disclosed herein. In general, the system 1400 enables multiple wireless users to transmit and receive data and other content. The system 1400 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 1400 includes user equipment (UE) 1410a-1410c, radio access networks (RANs) 1420a-1420b, a core network 1430, a public switched telephone network (PSTN) 1440, the Internet 1450, and other networks 1460. While certain numbers of these components or elements are shown in FIG. 10, any number of these components or elements may be included in the system 1400.

The UEs 1410a-1410c are configured to operate and/or communicate in the system 1400. For example, the UEs 1410a-1410c are configured to transmit and/or receive wireless signals or wired signals. Each UE 1410a-1410c represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 1420a-1420b here include base stations 1470a-1470b, respectively. Each base station 1470a-1470b is configured to wirelessly interface with one or more of the UEs 1410a-1410c to enable access to the core network 1430, the PSTN 1440, the Internet 1450, and/or the other networks 1460. For example, the base stations 1470a-1470b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router, or a server, router, switch, or other processing entity with a wired or wireless network.

In the embodiment shown in FIG. 10, the base station 1470a forms part of the RAN 1420a, which may include other base stations, elements, and/or devices. Also, the base station 1470b forms part of the RAN 1420b, which may include other base stations, elements, and/or devices. Each base station 1470a-1470b operates to transmit and/or receive wireless signals within a particular geographic region or area, sometimes referred to as a "cell." In some embodiments, multiple-input multiple-output (MIMO) technology may be employed having multiple transceivers for each cell.

The base stations 1470a-1470b communicate with one or more of the UEs 1410a-1410c over one or more air interfaces 1490 using wireless communication links. The air interfaces 1490 may utilize any suitable radio access technology.

It is contemplated that the system 1400 may use multiple channel access functionality, including such schemes as described above. In particular embodiments, the base stations and UEs implement LTE, LTE-A, and/or LTE-B. Of course, other multiple access schemes and wireless protocols may be utilized.

The RANs 1420a-1420b are in communication with the core network 1430 to provide the UEs 1410a-1410c with voice, data, application, Voice over Internet Protocol (VoIP), or other services. Understandably, the RANs 1420a-1420b and/or the core network 1430 may be in direct or indirect communication with one or more other RANs (not shown). The core network 1430 may also serve as a gateway access for other networks (such as PSTN 1440, Internet 1450, and other networks 1460). In addition, some or all of the UEs 1410a-1410c may include functionality for communicating with different wireless networks over different wireless links using different wireless technologies and/or protocols.

Although FIG. 10 illustrates one example of a communication system, various changes may be made to FIG. 10. For example, the communication system 1400 could include any number of UEs, base stations, networks, or other components in any suitable configuration, and can further include the EPC illustrated in any of the figures herein.

Figure 11A:
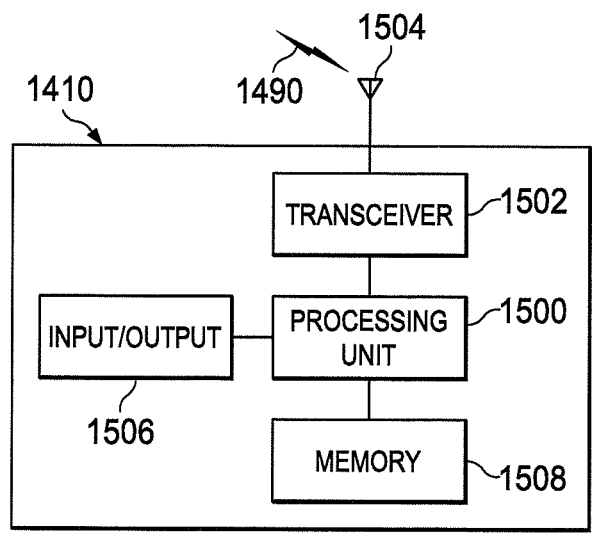
FIGS. 11A and 11B illustrate example devices in which the asynchronous processor and processing system may be utilized.
Figure 11B:
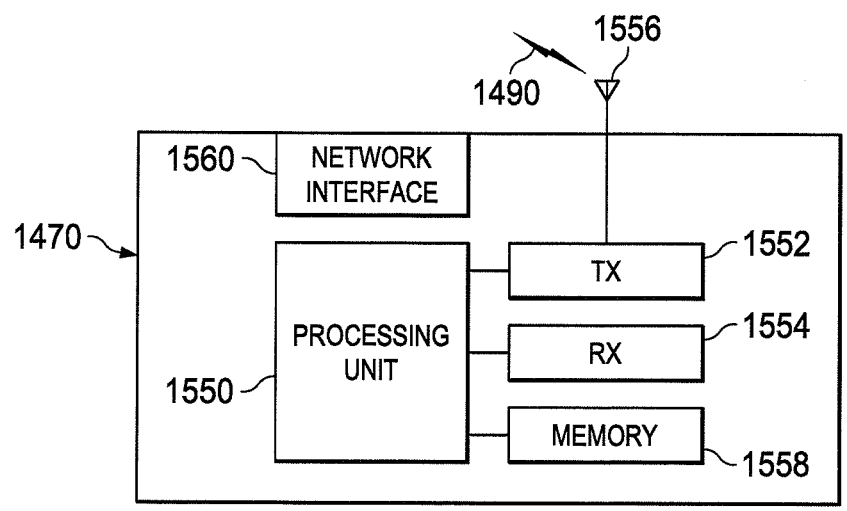

FIGS. 11A and 11B illustrate example devices that may implement the methods and teachings according to this disclosure. In particular, FIG. 11A illustrates an example UE 1410, and FIG. 11B illustrates an example base station 1470. These components could be used in the system 1400 of FIG. 10 or in any other suitable system.

As shown in FIG. 11A, the UE 1410 includes at least one processing unit 1500. The processing unit 1500 implements various processing operations of the UE 1410. For example, the processing unit 1500 could perform signal coding, data processing, power control, input/output processing, or any other functionality enabling the UE 1410 to operate in the system 1400. The processing unit 1500 also supports the methods and teachings described in more detail above. Each processing unit 1500 includes any suitable processing or computing device configured to perform one or more operations. Each processing unit 1500 could, for example, include a microprocessor, microcontroller, digital signal processor, field programmable gate array, or application specific integrated circuit. The processing unit 1500 may be an asynchronous processor 310, 330 or the processing system 300 as described herein.

The UE 1410 also includes at least one transceiver 1502. The transceiver 1502 is configured to modulate data or other content for transmission by at least one antenna 1504. The transceiver 1502 is also configured to demodulate data or other content received by the at least one antenna 1504. Each transceiver 1502 includes any suitable structure for generating signals for wireless transmission and/or processing signals received wirelessly. Each antenna 1504 includes any suitable structure for transmitting and/or receiving wireless signals. One or multiple transceivers 1502 could be used in the UE 1410, and one or multiple antennas 1504 could be used in the UE 1410. Although shown as a single functional unit, a transceiver 1502 could also be implemented using at least one transmitter and at least one separate receiver.

The UE 1410 further includes one or more input/output devices 1506. The input/output devices 1506 facilitate interaction with a user. Each input/output device 1506 includes any suitable structure for providing information to or receiving information from a user, such as a speaker, microphone, keypad, keyboard, display, or touch screen.

In addition, the UE 1410 includes at least one memory 1508. The memory 1508 stores instructions and data used, generated, or collected by the UE 1410. For example, the memory 1508 could store software or firmware instructions executed by the processing unit(s) 1500 and data used to reduce or eliminate interference in incoming signals. Each memory 1508 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 11B, the base station 1470 includes at least one processing unit 1550, at least one transmitter 1552, at least one receiver 1554, one or more antennas 1556, one or more network interfaces 1560, and at least one memory 1558. The processing unit 1550 implements various processing operations of the base station 1470, such as signal coding, data processing, power control, input/output processing, or any other functionality. The processing unit 1550 can also support the methods and teachings described in more detail above. Each processing unit 1550 includes any suitable processing or computing device configured to perform one or more operations. Each processing unit 1550 could, for example, include a microprocessor, microcontroller, digital signal processor, field programmable gate array, or application specific integrated circuit. The processing unit 1550 may be an asynchronous processor 310, 330 or the processing system 300 as described herein.

Each transmitter 1552 includes any suitable structure for generating signals for wireless transmission to one or more UEs or other devices. Each receiver 1554 includes any suitable structure for processing signals received wirelessly from one or more UEs or other devices. Although shown as separate components, at least one transmitter 1552 and at least one receiver 1554 could be combined into a transceiver. Each antenna 1556 includes any suitable structure for transmitting and/or receiving wireless signals. While a common antenna 1556 is shown here as being coupled to both the transmitter 1552 and the receiver 1554, one or more antennas 1556 could be coupled to the transmitter(s) 1552, and one or more separate antennas 1556 could be coupled to the receiver(s) 1554. Each memory 1558 includes any suitable volatile and/or non-volatile storage and retrieval device(s).

Additional details regarding UEs 1410 and base stations 1470 are known to those of skill in the art. As such, these details are omitted here for clarity.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method of operating an asynchronous processing system comprising an asynchronous scalar processor and an asynchronous vector processor coupled to the asynchronous scalar processor, the asynchronous vector processor comprising a plurality of parallel asynchronous vector execution units (VXU), the method comprising:
performing processing functions on input data at the asynchronous scalar processor and sending a very long instruction word (VLIW) to the asynchronous vector processor;
generating, by the parallel asynchronous VXU, an instruction execution result corresponding to the VLIW;
storing, in a register file, the instruction execution result generated by the parallel asynchronous VXU;
storing, in a history table, a time at which a register within the register file was last modified; and
detecting a data dependency via the history table based on the time at which the register within the register file was last modified.

2. The method in accordance with claim 1, further comprising:
storing the instruction execution result in a crossbar coupled to each parallel asynchronous VXU.

3. The method in accordance with claim 2, further comprising:
in response to a first vector execution result being currently stored in the crossbar, obtaining by a given parallel asynchronous VXU the first vector execution result from the crossbar and bypassing a fetch operation for the first vector execution result in the register file; and
in response to the first vector execution result being not currently stored in the crossbar, obtaining by the given parallel asynchronous VXU the first vector execution result from the register file.

4. The method in accordance with claim 1, wherein:
each parallel asynchronous VXU comprises token processing logic configured to receive, hold and pass a token from one parallel asynchronous VXU to another parallel asynchronous VXU; and
the token processing logic comprises a token signal path in the plurality of parallel asynchronous VXUs to enable propagation of the token through the plurality of parallel asynchronous VXUs, wherein possession of the token by one of the parallel asynchronous VXUs enables that parallel asynchronous VXU to conduct a transaction with a resource component that is shared among the plurality of parallel asynchronous VXUs.

5. The method in accordance with claim 1, further comprising:
decoding, by each of a plurality of decoders in each of the parallel asynchronous VXUs, a respective portion of the VLIW.

6. The method in accordance with claim 1, further comprising:
returning the instruction execution result from the asynchronous vector processor to the asynchronous scalar processor.

7. The method in accordance with claim 1, wherein the VLIW comprises a first portion and a second portion, at least the first portion comprising a vector instruction.

8. The method in accordance with claim 1, further comprising executing, by the parallel asynchronous VXU, three sub-instructions within the VLIW.

9. An asynchronous processing system comprising:
an asynchronous scalar processor configured to perform processing functions on input data and to output instructions;
an asynchronous vector processor coupled to the asynchronous scalar processor and configured to perform processing functions on a very long instruction word (VLIW) received from the asynchronous scalar processor;
the asynchronous vector processor comprising:
a plurality of parallel asynchronous vector execution units (VXU), each parallel asynchronous VXU configured to generate an instruction execution result;
a register file configured to store the instruction execution result generated from each parallel asynchronous VXU; and
a vector instruction fetch (VIF) block comprising an instruction dispatcher having a history table, the VIF block configured to receive the VLIW from the asynchronous scalar processor, the history table configured to store a time at which a register within the register file was last modified, and the instruction dispatcher configured to detect a data dependency via the history table based on the time at which the register within the register file was last modified.

10. The asynchronous processing system in accordance with claim 9, wherein the asynchronous vector processor further comprises:
a crossbar coupled to each parallel asynchronous VXU and to the VIF block, the crossbar configured to store the instruction execution result generated by each parallel asynchronous VXU.

11. The asynchronous processing system in accordance with claim 10, wherein:
in response to a first vector execution result being currently stored in the crossbar, a given asynchronous parallel VXU is configured to obtain the first vector execution result from the crossbar and bypass a fetch operation for the first vector execution result in the register file; and
in response to the first vector execution result being not currently stored in the crossbar, the given asynchronous parallel VXU is configured to obtain the first vector execution result from the register file.

12. The asynchronous processing system in accordance with claim 9, wherein each parallel asynchronous VXU comprises token processing logic configured to receive, hold and pass a token from one parallel asynchronous VXU to another parallel asynchronous VXU; and
wherein the token processing logic comprises a token signal path in the plurality of parallel asynchronous VXUs to enable propagation of the token through the plurality of parallel asynchronous VXUs, wherein possession of the token by one of the parallel asynchronous VXUs enables that parallel asynchronous VXU to conduct a transaction with a resource component that is shared among the plurality of parallel asynchronous VXUs.

13. The asynchronous processing system in accordance with claim 12, wherein the token processing logic is configured to propagate the token at a propagation rate that is related to a latency associated with the parallel asynchronous VXU.

14. The asynchronous processing system in accordance with claim 13, wherein the latency is variable and is based on an operation to be conducted by the parallel asynchronous VXU.

15. The asynchronous processing system in accordance with claim 9, wherein each parallel asynchronous VXU comprising a plurality of decoders, each decoder corresponding to a respective portion of the VLIW.

16. The asynchronous processing system in accordance with claim 9, wherein the asynchronous processing system further comprises:
 a register return port coupled to the asynchronous scalar processor and the asynchronous vector processor, the register return port configured to return the instruction execution result from the asynchronous vector processor to the asynchronous scalar processor.

17. The asynchronous processing system in accordance with claim 9, wherein the VIF block further comprises:
 an instruction first in first out (FIFO) memory configured to receive and store the VLIW from the asynchronous scalar processor; and
 an instruction pre-decoder processor configured to pre-process the VLIW.

18. The asynchronous processing system in accordance with claim 9, wherein the register file is coupled to each parallel asynchronous VXU and to the VIF block.

19. The asynchronous processing system in accordance with claim 9, wherein the VLIW comprises a first portion and a second portion, at least the first portion comprising a vector instruction.

20. The asynchronous processing system in accordance with claim 9, wherein each parallel asynchronous VXU is further configured to execute three sub-instructions within the VLIW.

* * * * *